United States Patent [19]
Pierson

[11] 3,870,641
[45] Mar. 11, 1975

[54] HORIZONTAL BELT FILTERS

[76] Inventor: Henri Gerhard Willem Pierson, Greenwood Bozeat, Wellingborough, England

[22] Filed: Sept. 24, 1973

[21] Appl. No.: 399,997

[52] U.S. Cl. .............................. 210/400, 210/406
[51] Int. Cl. ............................................ B01d 33/04
[58] Field of Search ....... 210/88, 91, 103, 400, 401, 210/406, 359, 387; 55/351, 352

[56] References Cited
UNITED STATES PATENTS

| | | | |
|---|---|---|---|
| 3,105,817 | 10/1963 | Seibert | 210/406 X |
| 3,190,451 | 6/1965 | Holland | 210/406 X |
| 3,335,862 | 8/1967 | Hirs | 210/410 X |
| 3,342,123 | 9/1967 | Ermaltov et al. | 210/400 X |
| 3,348,682 | 10/1967 | Aulich et al. | 210/401 X |
| 3,459,122 | 8/1969 | Pastoors et al. | 210/400 X |
| 3,690,466 | 9/1972 | Lee et al. | 210/406 |

Primary Examiner—Theodore A. Granger
Attorney, Agent, or Firm—Ross, Ross & Flavin

[57] ABSTRACT

A horizontal belt filter is described which comprises as a filtering medium, an endless belt of filter cloth having vacuum trays disposed beneath the upper horizontal reach. There being means to intermittently advance the belt, by a predetermined distance, said means comprising a moveable roller which is moveable by rams.

1 Claim, 1 Drawing Figure

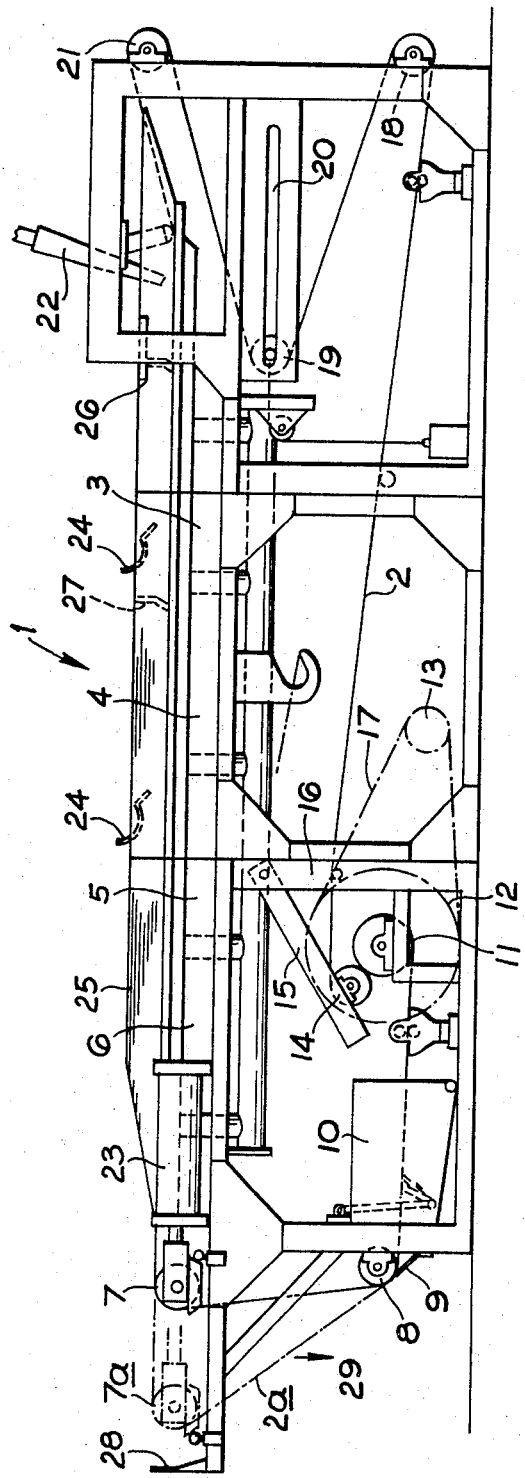

HORIZONTAL BELT FILTERS

This invention relates to improvements in horizontal belt filters.

Three general types of horizontal belt vacuum filters are known. Firstly there are belt filters which use a strong hollow rubber belt which is dragged over a series of vacuum trays which are being kept under constant vacuum. A filter cloth is located inside the rubber belt, and provides the filtration medium. Secondly, there are belt filters which consist of a series of steel vacuum pans which travel in a Jacob's Ladder fashion horizontally. These pans are connected with flexible hoses and mechanical seals to a vacuum system, and are kept under vacuum whilst the pans travel in one direction on the horizontal reach of the belt and have the vacuum cut off during the return strand.

A third form of known filter comprises a filter cloth in the form of an endless belt which travels continuously, with a plurality of vacuum pans acting on the underside of the upper reach of the filter cloth. This is done in such a fashion that on forward movement of the vacuum trays, the vacuum is applied to the vacuum trays and therefore de-watering takes place, whereas on the return stroke vacuum is cut off so that no filtration occurs.

The first two forms described have the disadvantage that a great deal of maintainance work is required, with correspondingly high running costs, while the third form has a disadvantageously high initial capital cost.

An object of the present invention is to overcome the mentioned disadvantages of the known forms of horizontal belt filters, by providing such a filter which is comparatively low in initial cost, and requires comparatively little maintenance.

According to the invention there is provided a horizontal belt filter, comprising as a filtering medium, an endless belt of filter cloth arranged to have an upper horizontal reach, vacuum trays disposed beneath said upper horizontal reach, and means for feeding material to be filtered onto said upper horizontal reach, characterised in that means are provided to intermittently advance the belt, by a predetermined distance.

A preferred embodiment of horizontal belt filter according to the invention will now be described by way of example, with reference to the accompanying drawing, the single FIGURE of which is a side elevation of a horizontal belt filter according to the invention.

As shown in the drawing, a filtration machine according to the invention, 1, has a filter in the form of an endless belt of filter cloth 2. The upper reach of belt 2 extends horizontally over a series of vacuum trays 3, 4, 5 and 6. Each tray is connected by vacuum pipes to vacuum pumps and devices for precipitating water entrained in the air sucked in from the trays. None of these lines, pumps or devices are shown in the drawing, in order to clarify the representations of the essential parts of the apparatus.

At the end of the upper reach, the belt 2 passes over a movable terminal discharge roller 7 which can be moved by rams 23 to an extended position 7a, shown in broken line in the drawing. After passing over roller 7, the belt passes round a lower fixed end roller 8, which is associated with a discharge knife or scraper 9. The belt then passes through a belt washer 10 wherein jets of water for example are disposed to play on the belt to remove traces of any filtrate remaining after discharge.

The belt next passes over drive roller 11 and drive contact roler 14. Drive roller 11 is driven via pulley 12, drive belt 17 and take off pulley 13 by a pneumatic motor, which is not shown. Drive contact roller 14 is carried on a beam 15 which is pivoted on a pillar 16 of the machine frame. The drive roller 11 and drive contact roller 14 each are provided with ratchets so that they can rotate only in the forward direction of the belt 2, so that they cannot be pulled back by outward movement of discharge roller 7.

The belt then passes in a lower reach to a lower end roller 18 and thence to a take-up or tensioning roller 19 which is slidably mounted in a slot 20 on each side. The roller 19 is loaded towards the left hand end of the slot as shown in the drawing, to give the greatest possible tension to the belt 2. After the tension roller 19, the belt 2 passes over an upper end roller 21, and thence returns to the upper horizontal reach where it passes below a feeding station. At the feeding station is a feeding chute 22, which is movable to spread material evenly over the width of the belt 2.

The feeding station is followed by first and second dams 26 and 27, which spread out the material further, and washing stations defined by feed troughs 24 which extend laterally across the path of the belt 2, to effect washing of liquid from the material being filtered. The upper reach of the belt is fenced on each side by inclined side walls 25 which extend upwardly from the vacuum trays.

Also forming part of the apparatus is an end baffle 28 mounted beyond extreme position 7a of roller 7, to prevent filter cake from being thrown off to the left of the drawing. Discharged filter cake falls in the direction of arrow 29 where it may pass to a hopper, bagging chute or further processing.

OPERATION

A slurry to be filtered is fed onto the filter belt 2 through the chute 22, which is moved appropriately to ensure even distribution over an area approximately 20 inches long and extending across the width of the belt.

The rams 23 are then operated and the roller 7 is pushed out to the position 7a, pulling the belt to the position shown in dot-dashed lines and indicated as 2a in the drawing. As the ratchet on drive roller 11 prevents pulling back of the belt 2, movement of roller 7 pulls the belt 2 to the left in the drawing along the upper reach. The slurry loaded onto the belt by chute 22 is pulled along until it lies over the first vacuum tray, 3. The distance of travel of the belt in this movement is 20 inches. The advancement of the upper reach of belt 2 causes tension roller 19 to be pulled to the right in slot 20.

When the movement is completed, the vacuum trays are switched on, that is their suction systems become active, and removal of liquid from the slurry commences. In the mean time, the drive advances the belt 2, and the tension on the belt returns the roller 7 to the right in the drawing, the pistons of rams 23 having been released by cessation of the fluid pressure. At the same time, the slack increases at roller 19 so that the latter is able to return to the left of slot 20.

As this is done, the chute 22 is spreading a new charge of slurry on the belt 2 immediately behind the first charge, and the process is then repeated, the charges of slurry each progressing in intermittent motion over the vacuum trays, which are switched "off" at each pulling forward stage, and "on" during each re-tensioning stage.

Eventually, the charge will reach the discharge roller 7, having had substantially all free liquid removed by the vacuum trays. The main bulk of the resulting cake drops down in the direction of arrow 29 as the roller 7 is retracted, and substantially all of the remainder is scraped off by blade 9. After this, the belt is washed clean at 10, by jets of water, but of course, other cleaning means may be used including brushes.

The rollers may be of mild steel or stainless steel. The drive roller and drive contact roller are covered with rubber to give better traction on the belt. The vacuum trays may be polypropylene, mild steel or stainless steel depending on the nature of the materials to be filtered and the nature of the liquids from which they are to be filtered. The vacuum trays are semipermanently bolted to the frame.

In the feeding of slurries onto the belt, the problems normally associated with evenly distributing fast setting solids on continuously moving filters have been substantially eliminated since the intermittent action allows for a continuous feed, whilst at the same time reciprocating rakes or spreaders can operate to ensure that each bed of slurry is presented to the vacuum trays in a smooth and level condition.

I claim:

1. A horizontal belt filter, comprising as a filtering medium, an endless belt of filter cloth arranged to have an upper horizontal reach, vacuum trays disposed beneath said upper horizontal reach, and means for feeding material to be filtered onto said upper horizontal reach, means for intermittently advancing the belt by a predetermined distance comprising a movable roller and rams which are extensible to move the roller outwardly, wherein the belt is driven through a roller which has a ratchet device to prevent pulling back of the belt on movement of the movable roller and including a tensioning roller which takes up a slack in the belt which is pulled out on movement of the movable roller.

* * * * *